United States Patent
Agarwal et al.

(10) Patent No.: US 11,645,269 B2
(45) Date of Patent: May 9, 2023

(54) AUTOMATIC EVENTS DETECTION FROM ENTERPRISE APPLICATIONS

(71) Applicant: International Business Machines Corporation, Armonk, NY (US)

(72) Inventors: Matu Agarwal, Bangalore (IN); Siddalinga Swamy, Bangalore (IN); Sayli Balonkar, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 373 days.

(21) Appl. No.: 16/910,974

(22) Filed: Jun. 24, 2020

(65) Prior Publication Data

US 2021/0406249 A1 Dec. 30, 2021

(51) Int. Cl.

| | |
|---|---|
| *G06F 16/23* | (2019.01) |
| *G06F 16/245* | (2019.01) |
| *G06F 40/40* | (2020.01) |
| *H04L 67/10* | (2022.01) |
| *G06Q 10/10* | (2023.01) |

(52) U.S. Cl.
CPC ........ *G06F 16/2379* (2019.01); *G06F 16/245* (2019.01); *G06F 40/40* (2020.01); *G06Q 10/10* (2013.01); *H04L 67/10* (2013.01)

(58) Field of Classification Search
CPC .... G06F 16/2379; G06F 16/245; G06F 40/40; G06Q 10/10; H04L 67/10
USPC ........................................................ 707/769
See application file for complete search history.

(56) References Cited

U.S. PATENT DOCUMENTS

| | | | |
|---|---|---|---|
| 9,389,980 B2 | 7/2016 | Ferris et al. | |
| 9,959,151 B2 | 5/2018 | Milliron et al. | |
| 2012/0072936 A1 | 3/2012 | Small et al. | |
| 2015/0082197 A1* | 3/2015 | Pearl | G06Q 10/10 715/753 |
| 2018/0024901 A1* | 1/2018 | Tankersley | G06Q 10/06393 707/694 |
| 2018/0165137 A1 | 6/2018 | Agarwal et al. | |
| 2018/0349946 A1 | 12/2018 | Nguyen et al. | |
| 2020/0026397 A1* | 1/2020 | Wohlstadter | G16C 20/10 |
| 2020/0374238 A1* | 11/2020 | Momchilov | H04L 47/781 |
| 2022/0179833 A1* | 6/2022 | Ramalingam | G06F 16/211 |
| 2022/0270725 A1* | 8/2022 | DeRosa-Grund | G06F 21/602 |

* cited by examiner

*Primary Examiner* — Joshua Bullock
(74) *Attorney, Agent, or Firm* — Troutman Pepper Hamilton Sanders LLP

(57) ABSTRACT

Embodiments provide a computer-implemented method for automatic detection of an event from an enterprise application, comprising: initiating a CRUD action connector of an integration platform; providing a business object name to the action connector; randomly obtaining a sample record from the enterprise application; creating a dummy record in the enterprise application, wherein the dummy record has a dummy record ID and a first time range within which the dummy record is created; and searching for a first timestamp field in a business object schema to determine whether the first timestamp field is queryable, wherein the first timestamp field indicates when the dummy record is created. If the first timestamp field exists, and the first timestamp field is queryable, then a first event indicating creation of the dummy record is detectable; if the first timestamp field does not exist, then the first event is undetectable.

20 Claims, 6 Drawing Sheets

New Accounts

The fields below configure App Connect to detect the event by polling ⓘ

*Created timestamp field ⓘ

| Created Date ▽ |

*Last updated timestamp field ⓘ

| LastModifiedDate ▽ |

Format of the timestamps ⓘ

| YYYY-MM-DDTHH:mm:ss.SSSZZ |

Timezone ⓘ

| UTC ▽ |

Check for new 'Account' every (minutes) ⓘ

| 5 ▽ |

Is created timestamp queryable ⓘ
☑

```
{
    "Id": "0011p00002fOfVcAAK",
    "IsDeleted": false,
    "MasterRecordId": null,
    "Name": "abc1232020-02-07T11:04:23.2323+00:00",
    "Type": null,
    "ParentId": null,
    "ShippingStreet": null,
    "ShippingCity": null,
    "ShippingState": null,
    "ShippingPostalCode": null,
    "ShippingCountry": null,
    "ShippingGeocodeAccuracy": null,
    "Phone": null,
    "OwnerId": "00524000001wKIaAAM",
    "CreatedDate": "2020-02-07T11:04:27.000+0000",
    "CreatedById": "00524000001wKIaAAM",
    "LastModifiedDate": "2020-02-07T11:04:27.000+0000",
    "LastModifiedById": "00524000001wKIaAAM",
    "SystemModstamp": "2020-02-07T11:04:27.000+0000",
    "LastActivityDate": null,
    "LastViewedDate": "2020-03-01T07:19:22.000+0000",
    "LastReferencedDate": "2020-03-01T07:19:22.000+0000",
    "attributes": {
       "type": "Account",
       "url": "/services/data/v42.0/sobjects/Account/0011p00002fOfVcAAK"
    }
}
```

FIG. 4

AUTOMATIC EVENTS DETECTION FROM ENTERPRISE APPLICATIONS

TECHNICAL FIELD

The present application generally relates to event detection from an enterprise application, and, in particular, to automatic event detection from an enterprise application.

BACKGROUND

Integration platform as a Service (iPaaS) delivers a cloud service for application, data, process, and service-oriented architecture (SOA) integration scenarios. As to an iPaaS integration platform, such as IBM® App Connect Enterprise, connectivity to various enterprise applications is an integral aspect of enabling the platform to be a comprehensive tool. Virtual connectors form a connector framework between the integration platform and the enterprise applications. The connector framework typically has two classifications: event and action connectors. Event connectors allow the integration platform to listen for events triggered, while action connectors allow the platform to perform an action on the enterprise application. Action connectors often perform "CRUD" (create, read, update or delete) operations on a record from an enterprise application, while event connectors detect events (like a "CREATED" event, an "UPDATED" event) whenever a record is created or updated in an enterprise application.

A connector framework generally requires a developer to develop both event and action connectors to resolve event and action use cases for a given enterprise application. The connector development is a time-consuming process requiring manual review and entry of information for creating a functioning connector. One tool often used in developing an event connector is a polling mechanism. The developer can leverage an action connector to perform polling on the enterprise application to detect events. However, the action connector should include a configuration that allows the action connector to identify that an event has occurred in the enterprise application. This can be achieved by using created/updated timestamp fields of the business objects and retrieving only the newly created/updated events using the action connector. While at least some current integration platforms allow the developer to configure an event poller to create an event connector, the developer is required to manually enter configuration parameters that enable the event poller to function. As illustrated in FIG. 1, an end-user, e.g., a developer, has to manually enter all the configuration parameters for event detection, which requires extensive knowledge on the enterprise application and APIs thereof. Thus, considerable time is required to understand application API behaviors, enterprise application configuration, etc.

Accordingly, it is desired to automatically obtain these configuration parameters on behalf of an end user, thus eliminating the need for the end user to understand the complexity of an enterprise application and its APIs.

SUMMARY

Embodiments provide a computer-implemented method for automatic detection of an event from an enterprise application in a data processing system comprising a processor and a memory comprising instructions which are executed by the processor, the method comprising: initiating a "Create," "Read," "Update," "Delete" (CRUD) action connector of an integration platform; providing a business object name to the action connector; randomly obtaining a sample record from the enterprise application, using a "Read" operation; creating a dummy record in the enterprise application, using a "Create" operation, wherein the sample record and the dummy record have a same format, and the dummy record has a dummy record ID and a first time range within which the dummy record is created; and searching for a first timestamp field in a business object schema to determine whether the first timestamp field is queryable, wherein the first timestamp field indicates when the dummy record is created. If the first timestamp field exists, and the first timestamp field is queryable, then a first event indicating creation of the dummy record is detectable; if the first timestamp field does not exist, then the first event is undetectable.

Embodiments further provide a method, further comprising: randomly updating a field of the dummy record, using an "Update" operation, wherein the updated dummy record has the dummy record ID and a second time range within which the dummy record is updated; and searching for a second timestamp field in the business object schema to determine whether the second timestamp field is queryable, wherein the second timestamp field indicates when the dummy record is updated. If the second timestamp field exists, and the second timestamp field is queryable, then a second event indicating an update of the dummy record is detectable; if the second timestamp field exists, and the second timestamp field is not queryable, then a second event is undetectable; if the second timestamp field does not exist, then a second event is undetectable.

Embodiments further provide a method, wherein if the first timestamp field exists, and the first timestamp field is not queryable, the method further comprising: comparing a value of the first timestamp field to a value of the second timestamp field. If the value of the first timestamp field is equal to the value of the second timestamp field, then the first event is detectable; if the value of the first timestamp field is earlier than the value of the second timestamp field, then the second event is detectable.

Embodiments further provide a method, further comprising deleting the dummy record, using a "Delete" operation.

Embodiments further provide a method, the step of searching for a first timestamp field further comprising: obtaining a first set of timestamp field candidates from the business object schema; obtaining a second set of timestamp field candidates from the first set of timestamp field candidates, wherein each of the second set of timestamp field candidates has a time value within the first time range; and obtaining a set of record candidates corresponding to the second set of timestamp field candidates from the enterprise application, using the "Read" operation. If the dummy record having the first timestamp field is in the set of record candidates, then the first timestamp field is queryable; if the dummy record having the first timestamp field is not in the set of record candidates, then the first timestamp field is not queryable.

Embodiments further provide a method, wherein each of the first set of timestamp field candidates has a field type related to time.

Embodiments further provide a method, wherein the first set of timestamp field candidates are obtained using Natural Language Processing techniques, wherein each of the first set of timestamp field candidates has a keyword related to time of creation.

Embodiments provide a computer program product for automatic detection of an event from an enterprise application, the computer program product comprising a computer readable storage medium having program instructions embodied therewith, the program instructions executable by a processor to cause the processor to: initiate a "Create," "Read," "Update," "Delete" (CRUD) action connector of an integration platform; provide a business object name to the action connector; randomly obtain a sample record from the enterprise application, using a "Read" operation; create a dummy record in the enterprise application, using a "Create" operation, wherein the sample record and the dummy record have a same format, and the dummy record has a dummy record ID and a first time range within which the dummy record is created; and search for a first timestamp field in a business object schema to determine whether the first timestamp field is queryable, wherein the first timestamp field indicates when the dummy record is created. If the first timestamp field exists, and the first timestamp field is queryable, then a first event indicating creation of the dummy record is detectable; if the first timestamp field does not exist, then the first event is undetectable.

Embodiments further provide a computer program product, wherein the processor is further caused to: randomly update a field of the dummy record, using an "Update" operation, wherein the updated dummy record has the dummy record ID and a second time range within which the dummy record is updated; and search for a second timestamp field in the business object schema to determine whether the second timestamp field is queryable, wherein the second timestamp field indicates when the dummy record is updated. If the second timestamp field exists, and the second timestamp field is queryable, then a second event indicating an update of the dummy record is detectable; if the second timestamp field exists, and the second timestamp field is not queryable, then the second event is undetectable; if the second timestamp field does not exist, then the second event is undetectable.

Embodiments further provide a computer program product, wherein if the first timestamp field exists, and the first timestamp field is not queryable, the processor is further caused to: compare a value of the first timestamp field to a value of the second timestamp field; if the value of the first timestamp field is equal to the value of the second timestamp field, then the first event is detectable; if the value of the first timestamp field is earlier than the value of the second timestamp field, then the second event is detectable.

Embodiments further provide a computer program product, wherein the processor is further caused to: delete the dummy record, using a "Delete" operation.

Embodiments further provide a computer program product, wherein the step of searching for a second timestamp field further causes the processor to: obtain a first set of timestamp field candidates from the business object schema; obtain a second set of timestamp field candidates from the first set of timestamp field candidates, wherein each of the second set of timestamp field candidates has a time value within the second time range; and obtain a set of record candidates corresponding to the second set of timestamp field candidates from the enterprise application, using the "Read" operation. If the dummy record having the second timestamp field is in the set of record candidates, then the second timestamp field is queryable; if the dummy record having the second timestamp field is not in the set of record candidates, then the second timestamp field is not queryable.

Embodiments further provide a computer program product, wherein each of the first set of timestamp field candidates has a field type related to time.

Embodiments further provide a computer program product, wherein the first set of timestamp field candidates are obtained using Natural Language Processing techniques, wherein each of the first set of timestamp field candidates has a keyword related to time of creation.

In another illustrative embodiment, a system is provided. The system may comprise a processor configured to perform various ones of, and combinations of, the operations outlined above with regard to the method illustrative embodiment.

Additional features and advantages of this disclosure will be made apparent from the following detailed description of illustrative embodiments that proceeds with reference to the accompanying drawings.

BRIEF DESCRIPTION OF THE DRAWINGS

The foregoing and other aspects of the present disclosure are best understood from the following detailed description when read in connection with the accompanying drawings. For the purpose of illustrating the disclosure, there is shown in the drawings embodiments that are presently preferred, it being understood, however, that the disclosure is not limited to the specific embodiments disclosed.

FIG. 1 depicts an exemplary user interface for manual entry of configuration information;

FIG. 4 is an example of a dummy record 400 that may be polled for determining whether a timestamp field is queryable;

DETAILED DESCRIPTION OF ILLUSTRATIVE EMBODIMENTS

The present disclosure may provide a system, a method, and/or a computer program product for event detection. The computer program product may include a computer-readable storage medium (or media) having computer-readable program instructions thereon for causing a processor to carry out aspects of the present invention.

Embodiments herein provide a smart event detection system based on a RESTful CRUD connector to detect events without using any manually provided configuration. In one aspect, the event detection system can automatically identify metadata information of a business object describing lifecycle actions performed on a System of Record (SOR). In another aspect, the event detection system can automatically identify an event configuration by performing lifecycle operations (CRUD operations) on a dummy record. This configuration helps the action connector detect lifecycle events happening in the system. The event detection system can detect events using an action connector, and thus eliminating the development of an event connector for event detection. Smart framework built on top of a RESTful action connector that can automatically detect events from an enterprise application without manual event configuration.

In an embodiment, the event configuration for a particular enterprise application includes an attribute indicating when a record is created, an attribute indicating when the record is updated/modified, a time zone in which the record is configured, and a time format in which the time stamp is stored in the record.

Figure 2:
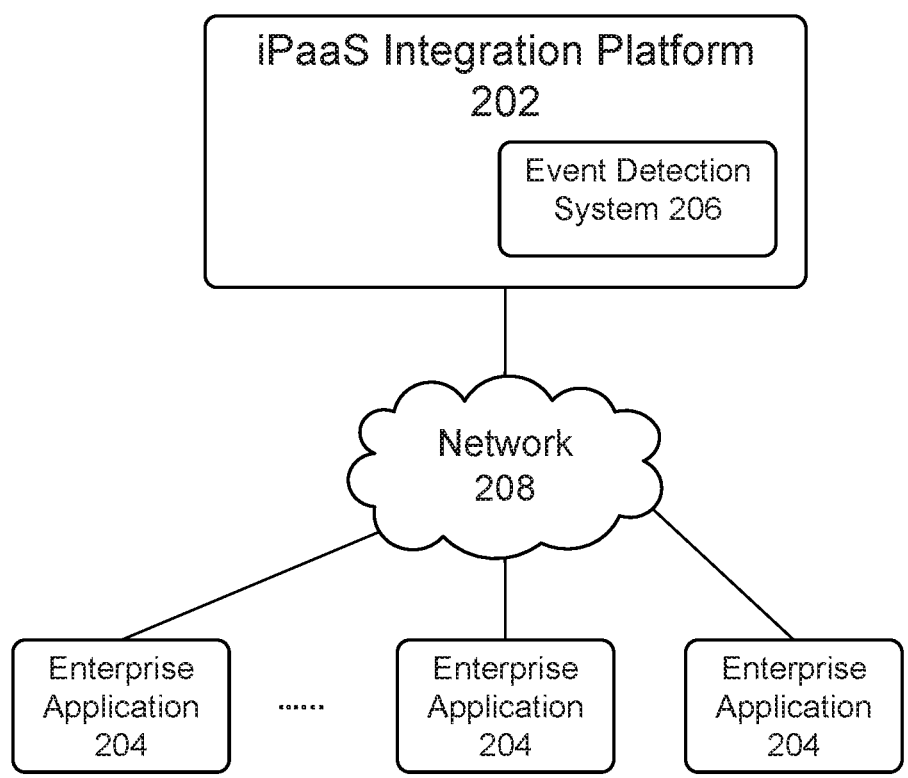
FIG. 2 depicts a block diagram of an exemplary framework architecture 200.

FIG. 2 is a block diagram of a framework architecture 200 in which the event detection system 206 is implemented, according to embodiments described herein. The framework architecture 200 may include an iPaaS integration platform 202 (e.g., IBM® App Connect Enterprise) and a plurality of enterprise applications 204. A network 208 may connect between the iPaaS integration platform 202 and the plurality of enterprise applications 204.

The iPaaS integration platform 202 is a cloud-based platform that connects various enterprise applications 204, systems, and technologies within the cloud or on premise. In an embodiment, the iPaaS integration platform 202 can be augmented with an event detection system 206, which can detect events without any manually provided configuration. In another embodiment, the event detection system 206 can be separated from the iPaaS integration platform 202. For example, the event detection system 206 can operate on a computing device, e.g., a desktop or laptop computer, mobile device, tablet, etc.

The enterprise applications 204 can be implemented on one or more end-user devices, each of which may be a computing device (e.g., a desktop or laptop computer, mobile device, tablet, etc.).

The network 208 may be a local or global network and may include wired and/or wireless components and functionality that enable communication between the iPaaS integration platform 202 and the enterprise applications 204. The network 208 may be embodied by the Internet, provided at least in part via cloud services, and/or may include one or more communication devices or systems that enable data transfer to and from the systems and components of the framework architecture 200.

In accordance with some exemplary embodiments, the framework architecture 200 includes a logic implemented in specialized hardware, software executed on hardware, or any combination of specialized hardware and software executed on hardware, for implementing the event detection system 206 or related components.

Figure 3:
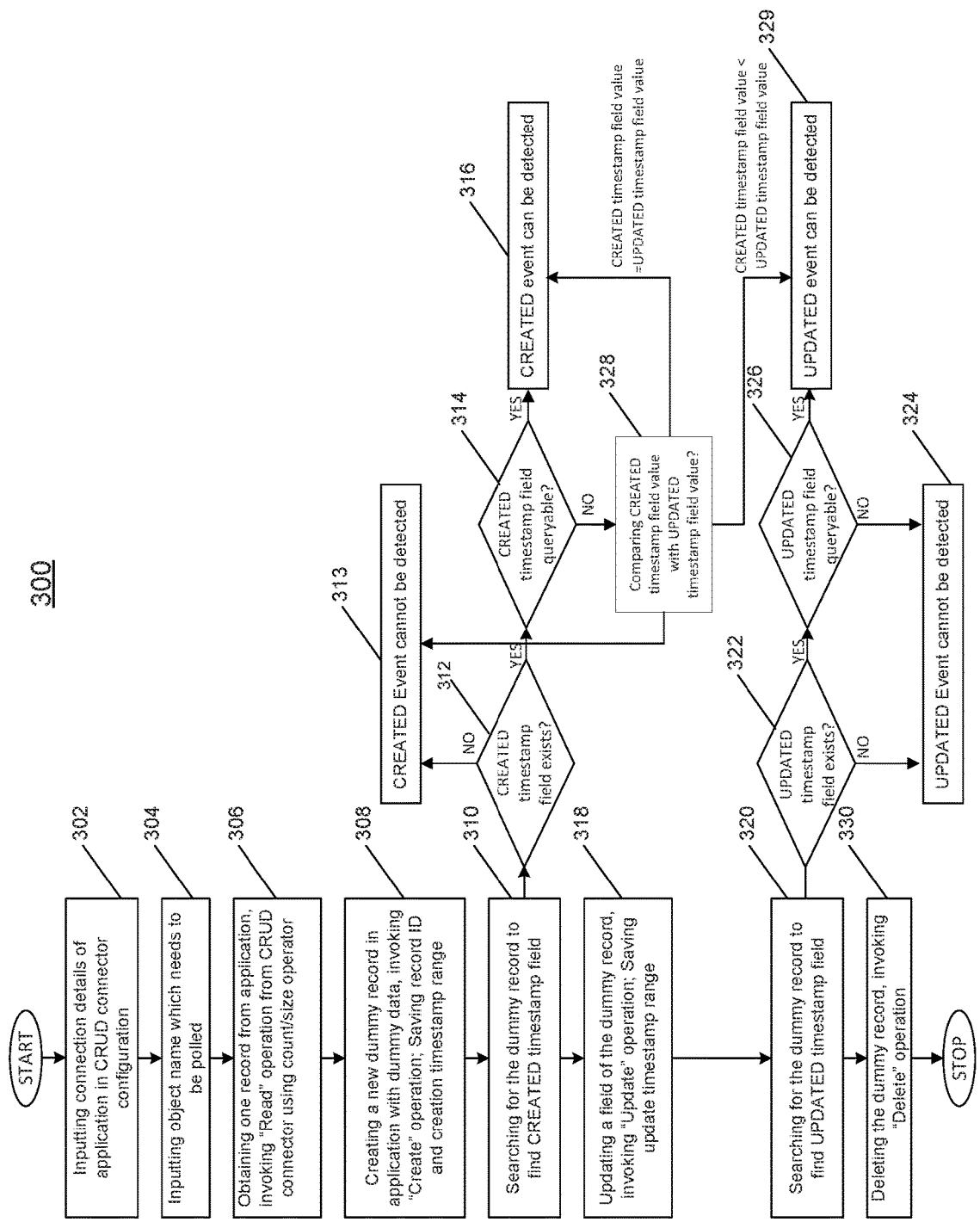
FIG. 3 depicts a flowchart of an exemplary process 300 for automatically detecting an event, according to embodiments described herein.

FIG. 3 depicts an exemplary process 300 for automatically detecting an event, according to embodiments described herein. The event detection system 206 can detect CREATED events and/or UPDATED events from an enterprise application without any manual intervention, e.g., manual configuration. As shown in FIG. 3, at step 302, the event detection system or the end user inputs the connection details of a particular enterprise application, and necessary configuration into the integration platform, so as to deploy/ initiate a CRUD action connector. For example, "consumer key," "consumer secret," "Token ID," "Token secret," "Account ID," etc. are input into the integration platform, so that the integration platform can obtain a hostname of the enterprise application and validate a credential of the enterprise application.

At step 304, a business object name is input into the integration platform, to indicate whose events need to be detected from a particular enterprise application. A business object is also known as a record type. It represents a record type in the particular enterprise application, for example an Account record type, a Contact record type, or a Sales Order record type. With the business object name, the integration platform can understand for which record type the integration platform needs to capture events.

At step 306, a sample record is randomly obtained from the enterprise application, invoking a "read" operation of the CRUD connector using a count/size operator. For example, a count operator is input into the integration platform, so that a "read" operation is performed to randomly obtain a sample record of a specific account (e.g., the account specified in the step 302) from the enterprise application.

At step 308, a new dummy record is created in the enterprise application with dummy data. The dummy record imitates the format of the sample record, but includes dummy data for most of the fields. The dummy record is created by invoking a "create" operation of the CRUD connector. FIG. 4 is an exemplary dummy record 400. As shown in FIG. 4, most of the fields are "null," while the fields related to creation time and modification time (i.e., update time) are available. The event detection system saves the dummy record ID and the first time range within which the dummy record is created. The first time range is from a time point when the "create" operation is invoked to a time point when a response is received from the enterprise application.

At step 310, the event detection system then searches for a "CREATED" timestamp field (e.g., "CreatedDate" as shown in FIG. 4) in a business object schema (metadata information of a record type), by means of the saved dummy record ID and the first time range, so as to determine whether the "CREATED" timestamp field is queryable. The business object schema is detailed information of the metadata of a record type. For example, a business object schema of the Account record includes metadata information of the Account record type. A "CREATED" event can be detected if the "CREATED" timestamp field exists and the "CREATED" timestamp field is also queryable. At step 312, the event detection system judges whether a "CREATED" timestamp field exists. If the "CREATED" timestamp field does not exist, then at step 313, the "CREATED" event cannot be detected. If the "CREATED" timestamp field exists, then at step 314, the event detection system judges whether the "CREATED" timestamp field is queryable. If the event detection system can locate the dummy record, then the "CREATED" timestamp field is queryable, and thus at step 316, the "CREATED" event can be detected.

At step 318, the event detection system updates any field of the dummy record, invoking an "update" operation of the CRUD connector. For example, the event detection system can update the field "ShippingState" from "null" to a random value, e.g., "P," thus invoking the "update" operation. The event detection system saves the dummy record ID and the second time range within which the dummy record is updated. The second time range is from a time point when the "update" operation is invoked to a time point when a response is received from the enterprise application.

At step 320, the event detection system searches for an "UPDATED" timestamp field (e.g., "LastModifiedDate" as shown in FIG. 4) in a business object schema, using the saved dummy record ID and the second time range, so as to determine whether the "UPDATED" timestamp field is queryable. An "UPDATED" event can be detected if the "UPDATED" timestamp field exists and the "UPDATED" timestamp field is also queryable. At step 322, the event detection system judges whether an "UPDATED" timestamp field exists. If the "UPDATED" timestamp field does not exist, then at step 324, the "UPDATED" event cannot be detected. If the "UPDATED" timestamp field exists, then at step 326, the event detection system judges whether the "UPDATED" timestamp field is queryable. If the event detection system can locate the dummy record, then the "UPDATED" timestamp field is queryable, and thus at step 329, the "UPDATED" event can be detected.

In an embodiment, either the "CREATED" event or the "UPDATED" event can be detected by comparing the "CREATED" timestamp field value and the "UPDATED" timestamp field value (step 328). For example, if the "CreatedDate" is equal to the "LastModifiedDate," then at step 316, the "CREATED" event can be detected; if the "CreatedDate" is earlier than the "LastModifiedDate," then at step 329, the "UPDATED" event can be detected; otherwise, at step 313, the "CREATED" event cannot be detected.

At step 330, the dummy record is deleted, invoking a "delete" operation of the CRUD connector. After the "CREATED" event and/or the "UPDATED" event are detected, the dummy record can be deleted if no events need to be detected.

Figure 5:
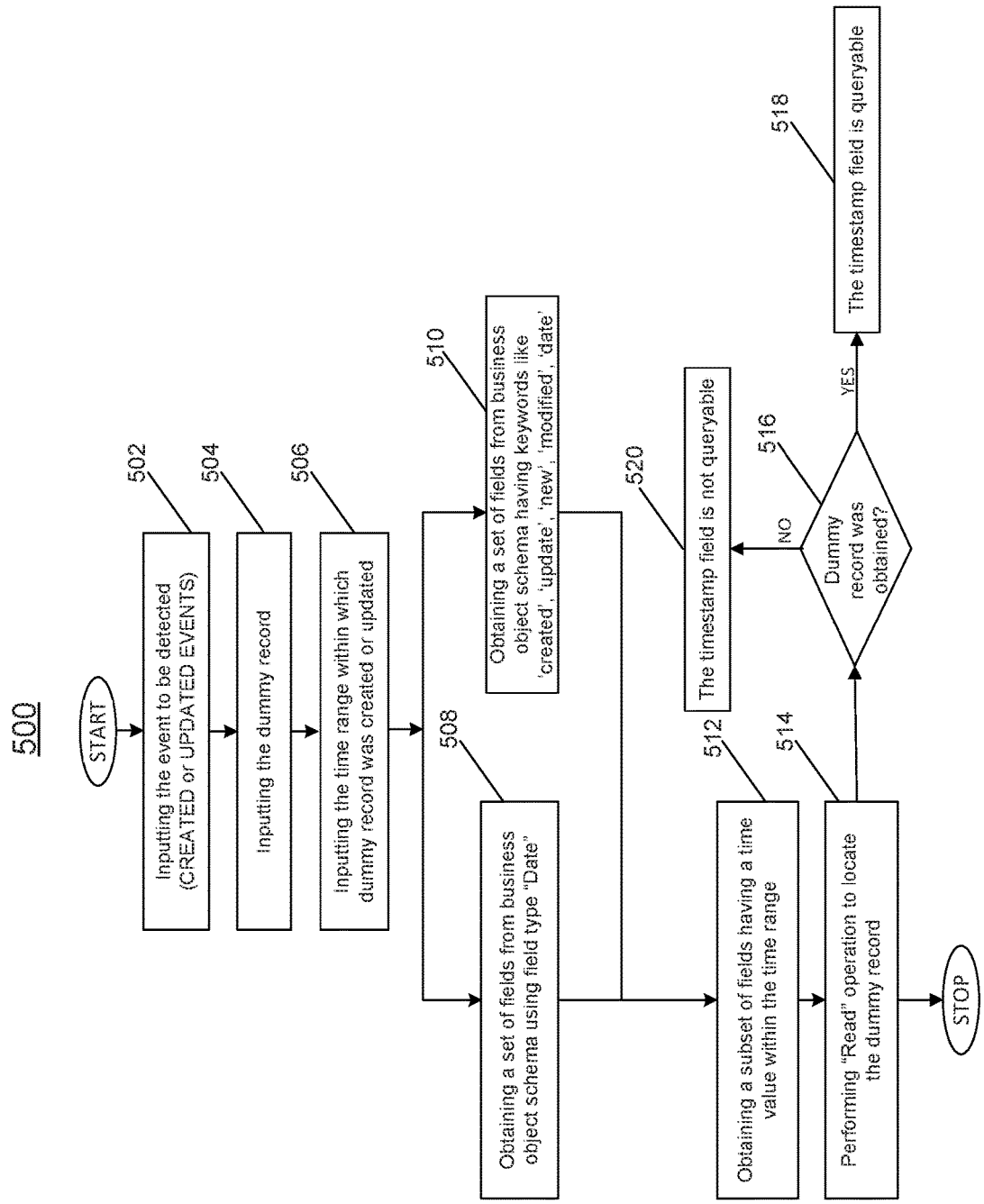
FIG. 5 depicts a flowchart of an exemplary process 500 for determining whether a timestamp field is queryable.

FIG. 5 depicts an exemplary process 500 for determining whether a timestamp field is queryable, according to embodiments described herein. The process as shown in FIG. 5 can obtain a set of timestamp field candidates, and then can locate the timestamp field that belongs to the dummy record from the set of timestamp field candidates. In an embodiment, when searching for a particular timestamp field (e.g., the "CREATED" timestamp field in step 310 or the "UPDATED" timestamp field in step 320), the following sub-steps of step 310 or step 320 can be performed.

At step 502, the event detection system indicates which event is to be detected. As to step 310, the "CREATED" event is to be detected, while as to step 320, the "UPDATED" event is to be detected.

At step 504, the event detection system provides the dummy record for the business object whose event needs to be detected.

At step 506, the event detection system provides the time range within which the dummy record is created or updated (e.g., the first time range for the "CREATED" event, or the second time range for the "UPDATED" event).

A first list of probable timestamp field candidates can be generated either based on the field type, or using Natural Language Processing (NLP) techniques. In an example, at step 508, the event detection system can obtain one or more fields from the business object schema using the type "Date," then all the fields having a "Date" type in the business object schema can be obtained. In another example, at step 510, the event detection system can obtain one or more fields from the business object schema using conventional Natural Language Processing (NLP) techniques. NLP algorithms can be trained to identify one or more fields having the following keywords or synonyms, e.g., "created," "create," "new," "date," "time," etc., for the "CREATED" timestamp field; "updated," "update," "modified," "date," "time," etc., for the "UPDATED" timestamp field.

At step 512, from the first list of probable timestamp field candidates, the event detection system can obtain any timestamp fields having a time value within the time range (e.g., the first time range for the "CREATED" event, or the second time range for the "UPDATED" event). The first list of probable timestamp field candidates is further narrowed down to form a second list of probable timestamp field candidates.

At step 514, the event detection system performs a "read" operation for each candidate in the second list of probable timestamp field candidates to retrieve the corresponding record. All the retrieved records form a list of record candidates.

At step 516, if the event detection system can find the dummy record in the set of the retrieved record candidates (the "CREATED" timestamp field or the "UPDATED" timestamp field in the dummy record is accordingly obtained), then at step 518, the timestamp field is queryable; if no dummy record is found in the set of the retrieved records, then at step 520, the timestamp field is not queryable.

Figure 6:
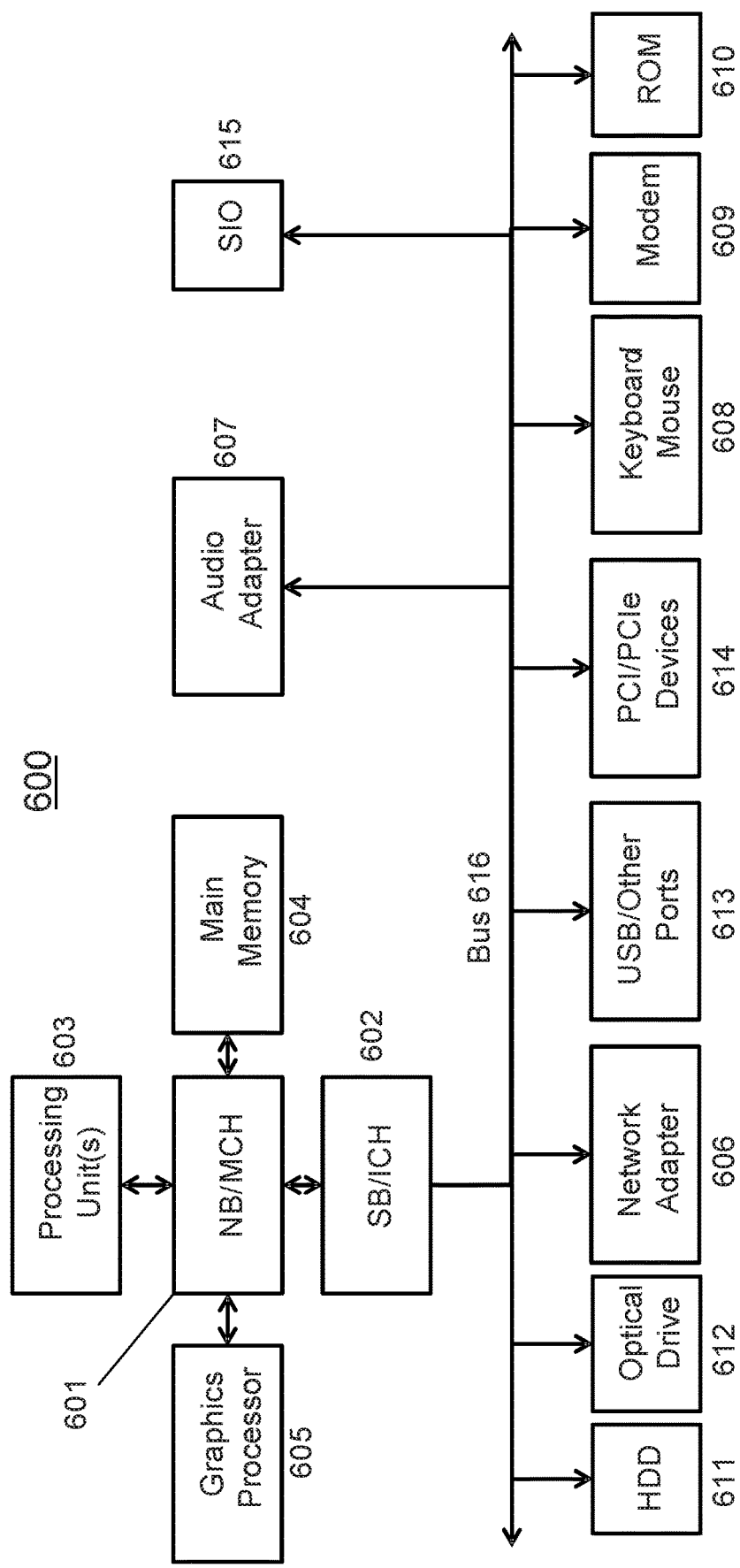
FIG. 6 depicts a block diagram of an example data processing system 600 in which aspect of the illustrative embodiments may be implemented.

FIG. 6 is a block diagram of an example data processing system 600 in which aspects of the illustrative embodiments are implemented. Data processing system 600 is an example of a computer in which computer usable code or instructions implementing the process for illustrative embodiments of the present invention are located. In one embodiment, FIG. 6 represents the iPaaS integration platform 202, which implements at least some of the aspects of the event detection system 206 described herein.

In the depicted example, data processing system 600 can employ a hub architecture including a north bridge and memory controller hub (NB/MCH) 601 and south bridge and input/output (I/O) controller hub (SB/ICH) 602. Processing unit 603, main memory 604, and graphics processor 605 can be connected to the NB/MCH 601. Graphics processor 605 can be connected to the NB/MCH 601 through an accelerated graphics port (AGP).

In the depicted example, the network adapter 606 connects to the SB/ICH 602. The audio adapter 607, keyboard and mouse adapter 608, modem 609, read-only memory (ROM) 610, hard disk drive (HDD) 611, optical drive (CD or DVD) 612, universal serial bus (USB) ports and other communication ports 613, and the PCI/PCIe devices 614 can connect to the SB/ICH 602 through bus system 616. PCI/PCIe devices 614 may include Ethernet adapters, add-in cards, and PC cards for notebook computers. ROM 610 may be, for example, a flash basic input/output system (BIOS). The HDD 611 and optical drive 612 can use an integrated drive electronics (IDE) or serial advanced technology attachment (SATA) interface. The super I/O (SIO) device 615 can be connected to the SB/ICH 602.

An operating system can run on processing unit 603. The operating system can coordinate and provide control of various components within the data processing system 600. As a client, the operating system can be a commercially available operating system. An object-oriented programming system, such as the Java™ programming system, may run in conjunction with the operating system and provide calls to the operating system from the object-oriented programs or applications executing on the data processing system 600. As a server, the data processing system 600 can be an IBM® eServer™ System p running the Advanced Interactive Executive operating system or the LINUX® operating system. The data processing system 600 can be a symmetric multiprocessor (SMP) system that can include a plurality of processors in the processing unit 603. Alternatively, a single processor system may be employed.

Instructions for the operating system, the object-oriented programming system, and applications or programs are located on storage devices, such as the HDD 611, and are loaded into the main memory 604 for execution by the processing unit 603. The processes for embodiments of the web site navigation system can be performed by the processing unit 603 using computer usable program code, which can be located in a memory such as, for example, main memory 604, ROM 610, or in one or more peripheral devices.

A bus system 616 can be comprised of one or more busses. The bus system 616 can be implemented using any type of communication fabric or architecture that can provide for a transfer of data between different components or devices attached to the fabric or architecture. A communication unit such as the modem 609 or network adapter 606 can include one or more devices that can be used to transmit and receive data.

Those of ordinary skill in the art will appreciate that the hardware depicted in FIG. 6 may vary depending on the implementation. For example, the data processing system 600 includes several components that would not be directly included in some embodiments of the event detection system 206. However, it should be understood that the event detection system 206 may include one or more of the components and configurations of the data processing system 600 for performing processing methods and steps in accordance with the disclosed embodiments.

Moreover, other internal hardware or peripheral devices, such as flash memory, equivalent non-volatile memory, or optical disk drives, may be used in addition to or in place of the hardware depicted. Moreover, the data processing system 600 can take the form of any of a number of different data processing systems, including but not limited to, client computing devices, server computing devices, tablet computers, laptop computers, telephone or other communication devices, personal digital assistants, and the like. Essentially, data processing system 600 can be any known or later developed data processing system without architectural limitation.

The present description and claims may make use of the terms "a," "at least one of," and "one or more of," with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the example provided herein without departing from the spirit and scope of the present disclosure.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a head disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN) and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java™ Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including LAN or WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Those of ordinary skill in the art will appreciate that the hardware required to run any of the systems and methods described herein may vary depending on the implementation. Other internal hardware or peripheral devices, such as flash memory, equivalent non-volatile memory, or optical disk drives may be used in addition to or in place of the hardware depicted. Moreover, any of the systems described herein can take the form of any of a number of different data processing systems, including but not limited to, client computing devices, server computing devices, tablet computers, laptop computers, telephone or other communication devices, personal digital assistants, and the like. Essentially, any of the systems described herein can be any known or later developed data processing system without architectural limitation.

The systems and methods of the figures are not exclusive. Other systems, and processes may be derived in accordance with the principles of embodiments described herein to accomplish the same objectives. It is to be understood that the embodiments and variations shown and described herein are for illustration purposes only. Modifications to the current design may be implemented by those skilled in the art, without departing from the scope of the embodiments. As described herein, the various systems, subsystems, agents, managers and processes can be implemented using hardware components, software components, and/or combinations thereof. No claim element herein is to be construed under the provisions of 35 U.S.C. 112 (f), unless the element is expressly recited using the phrase "means for."

Although the present invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

What is claimed is:

1. A computer-implemented method for automatic detection of an event from an enterprise application in a data processing system comprising a processor and a memory comprising instructions which are executed by the processor, the method comprising:
    initiating a "Create," "Read," "Update," "Delete" (CRUD) action connector of an integration platform;
    providing a business object name to the action connector;
    randomly obtaining a sample record from the enterprise application, using a "Read" operation;
    creating a dummy record in the enterprise application, using a "Create" operation, wherein the sample record and the dummy record have a same format, and the dummy record has a dummy record ID and a first time range within which the dummy record is created; and
    searching for a first timestamp field in a business object schema to determine whether the first timestamp field is queryable, wherein the first timestamp field indicates when the dummy record is created;
    if the first timestamp field exists, and the first timestamp field is queryable,
        then a first event indicating creation of the dummy record is detectable;
    if the first timestamp field does not exist,
        then the first event is undetectable.

2. The method of claim 1, further comprising:
    randomly updating a field of the dummy record, using an "Update" operation, wherein the updated dummy record has the dummy record ID and a second time range within which the dummy record is updated; and
    searching for a second timestamp field in the business object schema to determine whether the second timestamp field is queryable, wherein the second timestamp field indicates when the dummy record is updated;
    if the second timestamp field exists, and the second timestamp field is queryable, then a second event indicating an update of the dummy record is detectable;
if the second timestamp field exists, and the second timestamp field is not queryable,
then a second event is undetectable;
if the second timestamp field does not exist,
then a second event is undetectable.

3. The method of claim 2, wherein, if the first timestamp field exists, and the first timestamp field is not queryable, the method further comprising:
comparing a value of the first timestamp field to a value of the second timestamp field;
if the value of the first timestamp field is equal to the value of the second timestamp field, then the first event is detectable;
if the value of the first timestamp field is earlier than the value of the second timestamp field, then the second event is detectable.

4. The method of claim 1, further comprising deleting the dummy record, using a "Delete" operation.

5. The method of claim 1, the step of searching for a first timestamp field further comprising:
obtaining a first set of timestamp field candidates from the business object schema;
obtaining a second set of timestamp field candidates from the first set of timestamp field candidates, wherein each of the second set of timestamp field candidates has a time value within the first time range; and
obtaining a set of record candidates corresponding to the second set of timestamp field candidates from the enterprise application, using the "Read" operation;
if the dummy record having the first timestamp field is in the set of record candidates,
then the first timestamp field is queryable;
if the dummy record having the first timestamp field is not in the set of record candidates,
then the first timestamp field is not queryable.

6. The method of claim 5, wherein each of the first set of timestamp field candidates has a field type related to time.

7. The method of claim 5, wherein the first set of timestamp field candidates are obtained using Natural Language Processing techniques, wherein each of the first set of timestamp field candidates has a keyword related to time of creation.

8. A computer program product for automatic detection of an event from an enterprise application, the computer program product comprising a non-transitory computer readable storage medium having program instructions embodied therewith, the program instructions executable by a processor to cause the processor to:
initiate a "Create," "Read," "Update," "Delete" (CRUD) action connector of an integration platform;
provide a business object name to the action connector;
randomly obtain a sample record from the enterprise application, using a "Read" operation;
create a dummy record in the enterprise application, using a "Create" operation, wherein the sample record and the dummy record have a same format, and the dummy record has a dummy record ID and a first time range within which the dummy record is created; and
search for a first timestamp field in a business object schema to determine whether the first timestamp field is queryable, wherein the first timestamp field indicates when the dummy record is created;
if the first timestamp field exists, and the first timestamp field is queryable,
then a first event indicating creation of the dummy record is detectable;
if the first timestamp field does not exist,
then the first event is undetectable.

9. The computer program product as recited in claim 8, wherein the processor is further caused to:
randomly update a field of the dummy record, using an "Update" operation, wherein the updated dummy record has the dummy record ID and a second time range within which the dummy record is updated; and
search for a second timestamp field in the business object schema to determine whether the second timestamp field is queryable, wherein the second timestamp field indicates when the dummy record is updated;
if the second timestamp field exists, and the second timestamp field is queryable,
then a second event indicating an update of the dummy record is detectable;
if the second timestamp field exists, and the second timestamp field is not queryable,
then the second event is undetectable;
if the second timestamp field does not exist,
then the second event is undetectable.

10. The computer program product as recited in claim 9, wherein if the first timestamp field exists, and the first timestamp field is not queryable, the processor is further caused to:
compare a value of the first timestamp field to a value of the second timestamp field;
if the value of the first timestamp field is equal to the value of the second timestamp field, then the first event is detectable;
if the value of the first timestamp field is earlier than the value of the second timestamp field, then the second event is detectable.

11. The computer program product as recited in claim 9, wherein the step of searching for a second timestamp field further causes the processor to:
obtain a first set of timestamp field candidates from the business object schema;
obtain a second set of timestamp field candidates from the first set of timestamp field candidates, wherein each of the second set of timestamp field candidates has a time value within the second time range; and
obtain a set of record candidates corresponding to the second set of timestamp field candidates from the enterprise application, using the "Read" operation;
if the dummy record having the second timestamp field is in the set of record candidates,
then the second timestamp field is queryable;
if the dummy record having the second timestamp field is not in the set of record candidates,
then the second timestamp field is not queryable.

12. The computer program product as recited in claim 11, wherein each of the first set of timestamp field candidates has a field type related to time.

13. The computer program product as recited in claim 11, wherein the first set of timestamp field candidates are obtained using Natural Language Processing techniques, wherein each of the first set of timestamp field candidates has a keyword related to time of creation.

14. The computer program product as recited in claim 8, wherein the processor is further caused to:
delete the dummy record, using a "Delete" operation.

15. A system for automatic detection of an event from an enterprise application, comprising:
a processor configured to:

initiate a "Create," "Read," "Update," "Delete" (CRUD) action connector of an integration platform;
provide a business object name to the action connector;
randomly obtain a sample record from the enterprise application, using a "Read" operation;
create a dummy record in the enterprise application, using a "Create" operation, wherein the sample record and the dummy record have a same format, and the dummy record has a dummy record ID and a first time range within which the dummy record is created; and
search for a first timestamp field in a business object schema to determine whether the first timestamp field is queryable, wherein the first timestamp field indicates when the dummy record is created;
if the first timestamp field exists, and the first timestamp field is queryable,
then a first event indicating creation of the dummy record is detectable;
if the first timestamp field does not exist,
then the first event is undetectable.

16. The system as recited in claim 15, wherein the processor is further configured to:
randomly update a field of the dummy record, using an "Update" operation, wherein the updated dummy record has the dummy record ID and a second time range within which the dummy record is updated; and
search for a second timestamp field in the business object schema to determine whether the second timestamp field is queryable, wherein the second timestamp field indicates when the dummy record is updated;
if the second timestamp field exists, and the second timestamp field is queryable,
then a second event indicating an update of the dummy record is detectable;
if the second timestamp field exists, and the second timestamp field is not queryable,
then the second event is undetectable;
if the second timestamp field does not exist,
then the second event is undetectable.

17. The system as recited in claim 16, wherein if the first timestamp field exists, and the first timestamp field is not queryable, the processor is further configured to:
compare a value of the first timestamp field to a value of the second timestamp field;
if the value of the first timestamp field is equal to the value of the second timestamp field, then the first event is detectable;
if the value of the first timestamp field is earlier than the value of the second timestamp field, then the second event is detectable.

18. The system as recited in claim 16, wherein the step of searching for a second timestamp field further configures the processor to:
obtain a first set of timestamp field candidates from the business object schema;
obtain a second set of timestamp field candidates from the first set of timestamp field candidates, wherein each of the second set of timestamp field candidates has a time value within the second time range; and
obtain a set of record candidates corresponding to the second set of timestamp field candidates from the enterprise application, using the "Read" operation;
if the dummy record having the second timestamp field is in the set of record candidates,
then the second timestamp field is queryable;
if the dummy record having the second timestamp field is not in the set of record candidates,
then the second timestamp field is not queryable.

19. The system as recited in claim 18, wherein each of the first set of timestamp field candidates has a field type related to time.

20. The system as recited in claim 15, the processor is further configured to:
delete the dummy record, using a "Delete" operation.

* * * * *